(12) United States Patent
Koschinat

(10) Patent No.: US 9,840,235 B2
(45) Date of Patent: Dec. 12, 2017

(54) TELESCOPIC SUPPORT COMPRISING A SPINDLE, AND DRIVING SAID SPINDLE BY MEANS OF A CROWN WHEEL COMPRISING AN INTEGRATED THRUST BEARING FOR SUPPORTING LOADS

(71) Applicant: Hubert Koschinat, Hösbach (DE)

(72) Inventor: Hubert Koschinat, Hösbach (DE)

( * ) Notice: Subject to any disclaimer, the term of this patent is extended or adjusted under 35 U.S.C. 154(b) by 0 days.

(21) Appl. No.: 15/107,259

(22) PCT Filed: Dec. 19, 2014

(86) PCT No.: PCT/DE2014/000645
§ 371 (c)(1),
(2) Date: Jun. 22, 2016

(87) PCT Pub. No.: WO2015/096828
PCT Pub. Date: Jul. 2, 2015

(65) Prior Publication Data
US 2016/0332605 A1    Nov. 17, 2016

(30) Foreign Application Priority Data
Dec. 24, 2013  (DE) .................. 10 2013 022 132

(51) Int. Cl.
*B60S 9/08*  (2006.01)
*B60S 9/22*  (2006.01)
*B62D 63/08*  (2006.01)

(52) U.S. Cl.
CPC . *B60S 9/08* (2013.01); *B60S 9/22* (2013.01); *B62D 63/08* (2013.01)

(58) Field of Classification Search
CPC ...... B60S 9/04; B60S 9/08; B60S 9/22; B60S 9/12; B60S 9/10; B60S 9/06
See application file for complete search history.

(56) References Cited

U.S. PATENT DOCUMENTS 2,069,012 A    1/1937  Lynes
2,341,191 A *  2/1944  Orendorff ............... F16H 55/30
                                                    403/362
2,739,788 A    3/1956  Weaver
(Continued)

FOREIGN PATENT DOCUMENTS

DE    20 2004 001 054 U1    6/2004
DE    20 2005 018217 U1     4/2006
(Continued)

*Primary Examiner* — Hau V Phan
(74) *Attorney, Agent, or Firm* — McGlew and Tuttle, P.C.

(57) ABSTRACT

Vertical elongate support (2) for supporting a parked vehicle trailer (1), consisting of a top prop tube (21), an inner prop member (22) which can telescopically slide into the prop tube (21), and a threaded spindle (3) for moving the inner prop member (22) in relation to the prop tube (21), whereby the threaded spindle (3) meshes with a threaded bearing (31) that is secured to the upper end of the inner prop member (22). The upper end of the threaded spindle (3) is connected to a crown wheel (32), the upward-facing surface of which is part of a thrust bearing (33) or is designed to accommodate a thrust bearing (33). The thrust bearing (33) supports the vehicle trailer (1), either directly or via a cover (23) that is connected to the prop tube (21).

19 Claims, 2 Drawing Sheets

(56) References Cited

U.S. PATENT DOCUMENTS

| | | | | |
|---|---|---|---|---|
| 3,679,174 A * | 7/1972 | Boettcher | B60P 3/38 | 254/45 |
| 3,904,177 A * | 9/1975 | Dalton | B66F 3/24 | 254/103 |
| 4,479,750 A * | 10/1984 | Johnson, Jr. | B65G 67/02 | 254/45 |
| 4,796,864 A * | 1/1989 | Wilson | B60S 9/08 | 254/103 |
| 5,050,845 A * | 9/1991 | Aline | B60S 9/12 | 254/419 |
| 5,181,432 A * | 1/1993 | Allen | F01L 1/02 | 116/200 |
| 5,199,738 A * | 4/1993 | VanDenberg | B60S 9/08 | 192/69.91 |
| 5,273,256 A * | 12/1993 | Chambers | B60S 9/06 | 254/425 |
| 5,423,518 A * | 6/1995 | Baxter | B60S 9/08 | 254/419 |
| 5,451,076 A * | 9/1995 | Burkhead | B60S 9/10 | 280/475 |
| 5,553,825 A * | 9/1996 | Rasmussen | B60S 9/04 | 248/354.3 |
| 6,099,016 A * | 8/2000 | Peveler | B60S 9/08 | 254/419 |
| 6,260,882 B1 * | 7/2001 | Kingsbury | B60S 9/08 | 254/219 |
| 6,446,937 B1 * | 9/2002 | Straw, Sr. | B60S 9/08 | 248/352 |
| 6,623,035 B1 * | 9/2003 | Schneider | B60S 9/04 | 248/161 |
| 7,296,779 B2 * | 11/2007 | Bakshi | A47B 91/026 | 248/354.1 |
| 7,425,015 B1 * | 9/2008 | Schipman | B60D 1/66 | 280/400 |
| 7,429,061 B2 * | 9/2008 | Perkins | B60S 9/08 | 280/763.1 |
| 7,798,034 B2 * | 9/2010 | Drake | B66F 3/16 | 403/316 |
| 8,388,023 B2 * | 3/2013 | Birkholz | B60S 9/08 | 254/418 |
| 8,523,148 B2 * | 9/2013 | Beck | B60D 1/66 | 254/100 |
| 8,678,471 B2 * | 3/2014 | McCarthy | B60P 3/32 | 296/156 |
| 2005/0161656 A1 | 7/2005 | Riedl | | |

FOREIGN PATENT DOCUMENTS

| | | |
|---|---|---|
| DE | 20 2006 010 831 U1 | 11/2006 |
| EP | 0513 973 B1 | 7/1997 |
| FR | 709 232 A | 8/1931 |

* cited by examiner

US 9,840,235 B2

TELESCOPIC SUPPORT COMPRISING A SPINDLE, AND DRIVING SAID SPINDLE BY MEANS OF A CROWN WHEEL COMPRISING AN INTEGRATED THRUST BEARING FOR SUPPORTING LOADS

CROSS REFERENCE TO RELATED APPLICATIONS

This application is a United States National Phase Application of International Application PCT/DE2014/000645 filed Dec. 19, 2014 and claims the benefit of priority under 35 U.S.C. §119 of German Application 10 2013 022 132.3 filed Dec. 24, 2013, the entire contents of which are incorporated herein by reference.

FIELD OF THE INVENTION

The present invention relates to a vertical elongate support for supporting a parked vehicle trailer, consisting of a top prop tube, an inner prop member which can telescopically slide into the prop tube, and a threaded spindle for moving the inner prop member in relation to the prop tube, whereby the threaded spindle meshes with a threaded bearing that is secured to the upper end of the inner prop member.

BACKGROUND OF THE INVENTION

When a vehicle trailer, such as a semi-trailer shall be disconnected from its tractor, a vertical support, which is mounted on the trailer, will be elongated down to the parking ground in order to keep the trailer in a horizontal position continuously.

At the prior art mostly telescopic supports are used, which are usually mounted in pairs at the front of the frame of a semitrailer. They nearly always consist of a hollow prop tube, out of whose interior a lower part is extended downwards for parking. Because in practice while driving, the lower part is always retracted into the interior of the prop tube, it will be briefly referred to herein as inner prop.

For moving the inner prop member in relation to the prop tube serves as a simple, cost-effective and proven drive a threaded spindle inside of the prop tube and the inner prop member. When retracting and extending the threaded spindle will be rotated via a gear, which is located on top of the prop tube.

Within the prior art conventional designs of gears and standard fastenings of support devices to a frame of the vehicle are shown in the documents EP 513 973 B1, DE 20 2004 001 054 U1 and DE 10 2006 010 831 U1.

All variants have in common that the output shaft of the gear is leading into the interior of the prop tube and is carrying there a small bevel gear, which is arranged above a corresponding, large bevel gear, which is mounted at the upper end of the threaded spindle.

The disadvantage is that the shaft with the small bevel gear and the large bevel gear need a great installation space on top of the threaded spindle, which noticeably increases the overall height of the support, even when being retracted. Due to these results: high consumption of material, high costs of material and high weight of the system.

For this type of construction the following course of the supporting force within the supporting device is typical: The supporting force is directed from the parking ground to the inner prop member and the threaded bearing, which is welded into the inner prop member, and from there via the threaded spindle in a thrust bearing inside of a pressure plate, which is welded into the outer prop tube. From there the supporting force continues in the prop tube and further via the first mounting plate at the prop tube into a second mounting plate at the vehicle frame, which is done with a frictional connection between the screw couplings of the two mounting plates. This results in the following disadvantages: Within the prop tube a strongly dimensioned pressure plate must be aligned precisely, to transmit the supporting force. The pressure plate must be welded with sufficiently dimensioned welding seam, which entails high costs of production. The crown wheel must be connected detachably to the threaded spindle. This assembly is elaborate.

Al named telescopic supports are mounted to the vehicle frame in the same manner: the prop tubes are furnished with hole perforated plates. The rows of holes and the holes have identical distances to each other. Onto the frame of the vehicle there are welded mounting plates, whose hole-patterns coincide with the perforated plates of the supports. Via these two corresponding perforated plates the supporting devices can be bolted on in that height, which is appropriate for a certain vehicle trailer.

A disadvantage is that the trailer manufacturer has to produce the mounting plates and has to attach them to the frame of the vehicle trailer. In addition, these mounting plates are welded to areas of the longitudinal girders, which are highly stressed by bending and therefore technically are notches, which can cause tension cracks especially in the bottom flanges of the longitudinal girders, when dynamic oscillations plus bending due to the load will occur.

In addition the supporting devices are generally supported backwards on the vehicle-frame.

When using two supports, which shall be driven together, holes must be drilled into the girders in the appropriate height, through which a connecting shaft is passed, which transfers the driving force between the two supports. Every support will be bolted with its perforated plate on to the mounting plate at the frame, whereby it must be guaranteed that the clamping force of all the bolted connections generate a frictional connection, which is sufficient for the maximum of the supporting force.

Another disadvantageous effort is that for the mounting of the backwardly and diagonally directed struts eyes must be welded to the longitudinal girder of the vehicles frame and must be connected with the struts.

In most cases of the practice the supports will be extracted under a high pressure of time, but without any pressure of a load. An adjustment of the height of the support under load is generally only necessary, when a second tractor must be coupled, whose semitrailer coupling is located in another height above the parking ground as that one of the first tractor, which has dropped the trailer before, and in addition the second tractor has no air spring system, with which the height of the coupling above the parking ground can be adjusted. Therefore commonly used supports are equipped with a two-speed-gearbox—one load gear and one fast gear—for driving the threaded spindle.

In these gearboxes preferentially straight-cut gear-pairs are used for the transmission. Their disadvantage is that at every pair of wheels only one pair of teeth meshes with each other. Therefore the cogwheels must be dimensioned that large that this single pair of teeth can withstand the maximum of the circumferential force. In addition gears with cogged wheels must be protected reliably from dirt. Both provisions enlarge the weight of the system.

SUMMARY OF THE INVENTION

Against this background, the invention has given itself the task to eliminate the aforementioned disadvantages and for that in particular to reduce the overall height of the vertical support and to reduce the weight, the material costs, the manufacturing costs and the assembly efforts.

For vehicles with longitudinal girders below the platform for the load it shall be possible to mount a support underneath of the bottom side of said longitudinal girder.

For longitudinal girders with H- or U- or L shaped profiles it shall be possible to mount the support underneath of the bottom flange of these profiles without any intervention into the profile and without any damage of an anti-corrosion coating.

As solution teaches the invention that the upper end of the threaded spindle is connected to a crown wheel, of which the upward-facing surface is part of a thrust bearing or is designed to accommodate a thrust bearing, whereby the thrust bearing supports the vehicle trailer, either directly or via a cover that is connected to the prop tube.

The essential idea of the invention is to integrate the thrust bearing for deriving the weight force of the vehicle in a dish-shaped wheel—the crown wheel—for driving the threaded spindle. Said crown wheel works in a dual function:

In its first—already known—function the crown wheel receives a tangentially acting drive force via a toothing or via a friction-surface and transfers this driving force into a torque, which is passed into the threaded spindle. The spindle lifts or lowers a threaded bearing, on which is welded the inner prop member.

In its second—inventive—function, the upper surface of the crown wheel act itself as the lower part of a thrust bearing or takes on a separate thrust bearing, via which the weight-force of the vehicle is transferred directly into the threaded spindle.

The beneficial effect of the inventive crown wheel with integrated thrust bearing is the course of the supporting force within the support via the inner prop member and via the therein secured threaded bearing onto the threaded spindle further on to the crown wheel and from there via the cover, located on the support tube, into the vehicle frame or alternatively without the cover directly to the vehicle frame. In practice the crown wheel will have for the additional acceptance of the supporting force usually sufficient loading reserves, because it must be dimensioned for the transmission of the torque for lifting the maximum load on the trailer.

The previously common "detour" of the course of the force via a support plate inside the prop tube and the prop tube itself and further on via the two mounting plates on the prop tube and on the vehicle frame is omitted. Thereby not only the support plate is omitted, but also the necessary vertical section of the support. It is the essential feature of the invention that the force out of the weight of the vehicle trailer is carried only by the thrust bearing, which is integrated into the crown wheel on the threaded bearing.

According to the task a reduction of the overall height and of the weight of the support-system is, among others, achieved with the absence of the common support plate.

The two functions of an inventive crown wheel as a drive for the threaded spindle and as a carrier of the weight force of the vehicle trailer can be performed in different variants for the drive and for the axial thrust bearing.

In a simple embodiment the thrust bearing contacts directly an area on the underside of the vehicle trailer. Alternatively between the thrust bearing and the underside of the vehicle can be inserted a cover, which caps the upper side of the prop tube. Preferably the bottom side of said cover should be designed as an equivalent to the upper surface of the crown wheel. If said cover is dimensioned strong enough, it is possible, to mount the support in the until now common manner at the side of the longitudinal girder with the known perforated plates at the support and at the vehicle trailer and with bolted connections.

Principally it is also possible, to design the relatively highly loaded thrust bearing as a sliding bearing, because in the actual practice a movement of the threaded spindle under maximal load is quite rare.

For a larger quantity of load cycles the invention prefers as thrust bearing a deep groove ball bearing. Both into the upward-facing surface of the crown wheel and into the downwardly facing surface of the cover is formed a circular running groove, in which are some balls rolling of. An Alternative is a tapered roller bearing. Compared with sliding bearings the friction is reduced with ball bearings or tapered roller bearings, what should be preferred, when the bearing is arranged on the side of the load—in this case above the crown wheel.

For a smaller number of load cycles an embodiment of the thrust bearing with one single ball is applicable. This ball moves in a first central recess in the upwardly facing surface of the crown wheel and in a second central recess in the downwardly facing surface of the cover. Because balls with a very high hardness are available out of the actual production of ball bearings at relatively low cost, the bearing surface of the ball in the crown wheel and in the cover can be kept very small. In this way is formed above and below the ball a relatively robust sliding bearing.

In a first alternative at least one small bevel gear is suitable as a drive for the crown wheel at the upper end of the threaded spindle. Said bevel gear is aligned perpendicular to the large crown wheel. For this purpose the crown wheel must be provided with a complementary toothing, which is designed as a large bevel gear. In order to create sufficient space for the integration of the small bevel gear, the prior art needs to extend the prop tube above the pressure plate by the diameter of the small bevel gear and by the axial length of the crown wheel.

The decisive progress of the invention is that no longer additional space for the bevel gears is necessary, because the several bevel gears or the single bevel gear are arranged beneath the crown wheel and said crown wheel additionally fulfills the function of the previously used separate pressure plate. With a support according to the present invention are all the small bevel gears or one single small bevel gear located below the crown wheel, whereby the upper portion of the support, which was necessary at the prior art, is omitted. With the present invention the small bevel gear and the upper end of the threaded spindle overlap each other.

If a notch for each small bevel gear is formed in the upper edge of the inner prop member, said inner prop member protrudes said small bevel gears and even right up to the underside of the crown wheel or—if present—up to the axial guide. Thereby the overall height of an inventive support is reduced.

A very simple alternative construction for driving the crown wheel with a bevel gear is a frictional wheel, which is pressed on a complementarily shaped surface on the circumference of the crown wheel.

In another variation a toothing is formed on the end edge of the crown wheel, into which a spur gear engages, which protrudes from the outside through a slot into the interior of the prop tube. This spur gear must be pivot-mounted and driven on the outside of the prop tube. Because this embodiment does not need any driving elements inside the prop tube, neither above nor below the crown wheels, a particularly low profile of the support is possible.

Another embodiment of the drive for the crown wheel is a worm gear. Because it meshes with a toothing at the edge of the crown wheel, the support is with this variant of a small overall height of the drive too. Because a worm gear allows a higher ratio of transmission in a single stage than with spur gears or with bevel gears, it is another advantageous embodiment of a worm gear, which is suitable for lifting a fully loaded vehicle trailer, to plug a crank directly on the shaft of the worm. The other end of this shaft can be extended to a neighboring second support. This second support is driven in the same direction of rotation as the first support and can be produced identical to the first support.

Alternatively the toothings on the edge of the crown wheel and on the edge of the spur gear are shaped complementarily to a chain or a toothed belt or a ball chain. The toothings of both wheels are separated from each other and are linked only via said chain or said belt. Since the chain or the belt wind around the outer spur gear and the crown wheel in the interior of the prop tube, a plurality of teeth is simultaneously in engagement. Therefore the teeth of the crown wheel and of the driving chain-wheel or belt-wheel can be dimensioned extremely narrow, which reduces the overall height and the weight of the support further.

For each type of drive tangentially directed forces are acting on the edge of the crown wheel. In order that the crown wheel can convert these forces into a torque, which is transmitted to the threaded spindle, a radial restraint over or under the crown wheel at the upper end of the threaded spindle is necessary. This function of a radial guidance is preferably taken over by the balls, which are embedded in the tracks of the crown wheel and of the cover or by the single ball, which is as well countersinked deeply enough into the crown wheel and the cover.

If instead of a ball bearing a sliding bearing between the crown wheel and the cover was selected, the threaded spindle will be guided at the upper part with a radial bearing, which is arranged between the axially guiding bearing plate and a lower flange of the crown wheel or of the threaded spindle. As the second and lower mounting serves the threaded bearing.

Depending on the direction of rotation of the threaded spindle, the inner prop member is extended or retracted. For this purpose the assembly group consisting of crown wheel, threaded spindle and inner prop member needs a restraint in the longitudinal direction of the support, which is its axial direction. This function can be achieved with several constructions.

If the crown wheel is driven from its underside by at least one bevel gear, an additional restraint in the axial direction of the spindle is expendable, because the crown wheel will be guided in the vertical direction between the thrust bearing with its upper side and the bevel gears with its bottom side. However if the bevel gears should not be constantly burdened by the weight of the inner prop member, is to provide an axial guidance below the crown wheel.

If the drive contacts the crown wheel at its lateral face, such as a worm gear, a spur gear or a toothed belt, then an axial guidance is essential.

In the interest of a small height of the support, the invention prefers that the axial guidance is located below the toothing and is mounted in or on the prop tube. Through an opening in the axial guidance leads the threaded spindle.

An axial bearing is formed by a downwardly facing shoulder, a small platform or a recess at the crown wheel or at the top section of the threaded spindle and by a complementary profile, which runs around the opening in the axial guidance. Principally it is possible, to locate such an axial bearing above the toothing of the crown wheel.

All variants of the drive for the crown wheel include a first stage of transmission, because the crown wheel reasonably has a larger diameter than the driving wheel. This reduces the torque, which is necessary to lift the vehicle trailer. With a second stage of transmission a fast speed or a load speed can be activated optionally.

Instead of the traditional gearbox with straight spur gears, the invention proposes a transmission gear with a chain. As already mentioned there are always several teeth in contact, so that the sprockets can be very narrow. Thus they are—according to the task—lightweighter and cheaper. Particularly attractive is the use of standard parts from other industries.

For such a transmission gear shall the worm gear or the bevel gear—which meshes with the crown wheel—be mounted on a main shaft, which is bedded in the prop tube. On this main shaft, a first sprocket is mounted, which is connected via a chain or a belt with a second sprocket, which is rotatably mounted on an auxiliary shaft.

When the diameter of the second sprocket is larger than the diameter of the first sprocket, the transmission ratio is reduced. That is, for example, useful when driving the crown wheel by a worm in an unloaded fast stage operating mode. If the crown wheel is however driven by a straight-tooth bevel gear, it may also be useful that the second sprocket of the chain transmission has a smaller diameter than the first sprocket. Thereby, the required torque is reduced when lifting the fully loaded trailer. Such a chain transmission can be enlarged in a very simple manner to become a two-speed transmission: the driving torque is coupled either on the main shaft or on the auxiliary shaft.

Such a transmission can be optionally aligned so that it protrudes upwards above the bottom flange of the longitudinal girder. Then it is located at the side of the longitudinal girder. If the prop tube is closed with a cover and this cover is extended beyond the edge of the prop tube forming a free arm, which is angulated, then the transmission can be mounted on it and an auxiliary shaft can be pivoted there.

An inventive support principally can be placed anywhere at the underside of the vehicle trailer. Because the inventive structure of the drive for the threaded spindle with a crown wheel and an integrated thrust bearing allows an extremely low overall height of the support, which is not known until now, it is possible now, to construct supports with such a small height, that they can be mounted underneath the longitudinal girder of common trailers with wheels on rims with 22.5 inches diameter.

Together with especially low pedestals the inventive crown wheel reduces the overall height of a retracted support further. Even for trailers with wheels of around 100 cm diameter, e.g. 19.5 inch tyres or 22.5 inch low-profile tyres, and a level above ground of around 78 cm for the bottom flange it is possible now, to mount the support underneath the longitudinal girder, whereby a safe ground clearance and a sufficient stroke is ensured. Thereby it can be saved, to mount the support at the side of the longitudinal girder including the welding and the bolting at the two complementary mounting plates, which have to be manufactured additionally.

Instead of bolting the invention prefers a retaining clamp, which connects the supporting device detachably with the bottom flange of the longitudinal girder. If for example one single piece or two pieces of U-shaped clamps are formed on or built on the cover or on the prop tube, they enfold the bottom flange. The free arm of the Ushaped retaining clamp is suitable for the mounting of a clamp fastening, which is pressed from there down onto the bottom flange and secures the entire support.

To avoid paint damage of the bottom flange of the vehicles girder, it is useful, to put a corrosion protective plate—for example zinc metal, between the bottom flange and the cover and to equip the clamping screws with rotatable and anti corrosive pressure disks.

A similar retaining bracket with clamp-mounting can be used to attach additional diagonal struts to the lower flange. Alternatively the retaining clamp of the support can be elongated, so that it carries the diagonal strut in addition. Thus the number of retaining brackets and clamps can be reduced.

Another embodiment of the struts are gusset plates between the prop tube and the retaining bracket. The version with gusset plates is particularly suitable for a mounting in the front part of the standard profile of the vehicles girder, were the height of the profile is reduced near to the support in the direction towards the coupling of the trailer.

A necessary subfunction of an inventive support is to limit the possible vertical movement of the inner prop member. This ensures that the inner prop member is extracted only so far that the length of the overlapping with the outer prop tube is sufficient for the required safety against buckling.

It is another idea of the invention that this limitation is taken over by the prop tube together with the inner prop member. For that purpose the invention places two guiding sleeves between the prop tube and the inner prop member. The upper guiding sleeve is mounted on the outside of the inner prop member near its upper end and can slide on the inner surface of the prop tube. The lower guiding sleeve is mounted and preferably releasably secured on the inside of the prop tube near its lower end and can slide on the outer surface of the inner prop member. The prop tube and the inner prop member do not slide directly on each other, but will be guided by the two guiding sleeves.

The lower guiding sleeve is only mounted at the lower end of the prop tube and fixed thereon after the inner prop member is inserted with the fixed upper guiding sleeve at its upper end.

If the inner prop member is pushed down to the maximum permissible way out of the prop tube, the end edges of the two guiding sleeves abut and thus limit the stroke. Then the thread on the spindle must be only so long that it extends down into the threaded bearing. The smallest overlapping between the inner prop member and the prop tube, which is necessary for a sufficient buckling strength of the support, is achieved, when the sum of the height of both guiding sleeves is as large as the width of the inner prop member. Additionally the guiding sleeves reinforce the end of the inner prop member and the prop tube, which are especially stressed in the extracted position by lateral forces.

An advantage of these guiding sleeves is in practice that for the prop tube and the inner prop member can be used cost-efficient welded pipes, which need not be especially straightened, but may differ from the otherwise necessary, precise straightness with that distortion, which is caused by the welding.

For the purposes of the invention it is the most important advantage that the threaded spindle does not have to be provided at its lower end with an additional safeguard to limit the stroke and therefore must no longer to be extended so far that this safeguard can be mounted. According to the task of this invention this effect reduces the overall height of the support further on.

By convention are most trailers equipped with two spaced-apart supports, which are extracted and retracted with one common drive. Previously the drive shafts of both supports were primarily connected by rotating tubes or shafts. Such a connection of two supports is also suitable for a support according to the invention.

If each crown wheel is driven by a worm gear or if each crown wheel and the driving gear are provided with a hypoid toothing, then—as mentioned—the axes of the two driving wheels can be connected with a continuous shaft. For operating e.g. a hand crank or a switchable gear set is joined to one of the two free shaft ends.

If alternatively the drive of each crown wheel is a straight toothed bevel gear, the axes of said two bevel gears can not be interconnected because the bevel gears are disposed below the crown wheels, so that the extension of the axes of said bevel gears would have to cross the threaded spindle. Instead, the invention prefers that a second bevel gear is disposed on the opposite side of the threaded spindle, which is driven by the crown wheel. Said second bevel gear is connected via a shaft with a further bevel gear, which drives the crown wheel in the second support.

It should be noted that the second—driven—bevel gear within the first support rotates in relation to the first—driving—bevel gear in the opposite direction. Thereby the further bevel gear in the second support is driven too with the opposite direction of rotation. In order to move although the inner prop members in the two coupled supports in the same direction, it is the easiest to built in threaded spindles with the opposite sense of rotation: The first threaded spindle has a righthanded thread, the second spindle has a left-handed thread, or vice versa.

If the installation of two identical threaded spindles in the two adjacent supports results in a significant cost advantage, both must be driven in the same direction of rotation. In this case, the invention proposes that the shaft for connecting the second bevel gear with the further bevel gear in the adjacent support is divided in two half-shafts. However, the ends of which are overlapped and closed each with a spur gear which meshes with the opposite spur gear on the other half-shaft. Thus, the direction of rotation is inverted. The resulting slight angular offset can be compensated by flexible half-shafts or an "oblique" arrangement of the half-shafts.

Another alternative is a connecting shaft, which is mounted laterally on the supports, and is connected at both ends by chains or spur gears with the respective main shafts so that the same sense of rotation in the threaded spindles of the two supports is achieved. Another way to rotate the second half-shaft in the opposite direction to the first half-shaft is a differential gear similar to motor vehicles between the driving wheels of an axle. Preferably, the first half-shaft is extended and the second shortened to such an extent that the housing of the differential gear is fixed on to the second support. The three bevel gears in said differential gear cause to move the threaded spindles of both supports in the same rotational direction.

Alternatively, the invention proposes that the two threaded spindles in the adjacent supports are connected by a chain or by a toothed belt or by a ball chain and thus can be brought in rotation together. The chain or the toothed belt or the ball chain must intervene for this purpose in complementary toothings in each crown wheel of the two supports. An arrangement of this toothings on both crown wheels is a particularly simple alternative. In each support only two openings are required, through which the chain or belt is passed.

In another embodiment, the toothings will be formed onto two spur gears or worm gears or bevel gears or onto auxiliary wheels, which are connected with one of the three latter types of wheels. In all variants the two auxiliary wheels are connected with a chain or a belt outside of the two supports.

In all embodiments a device for tensioning the chain or the belt increases the operational reliability. Likewise a casing of the chain or of the belt extends the time of life considerably by keeping out contaminants.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
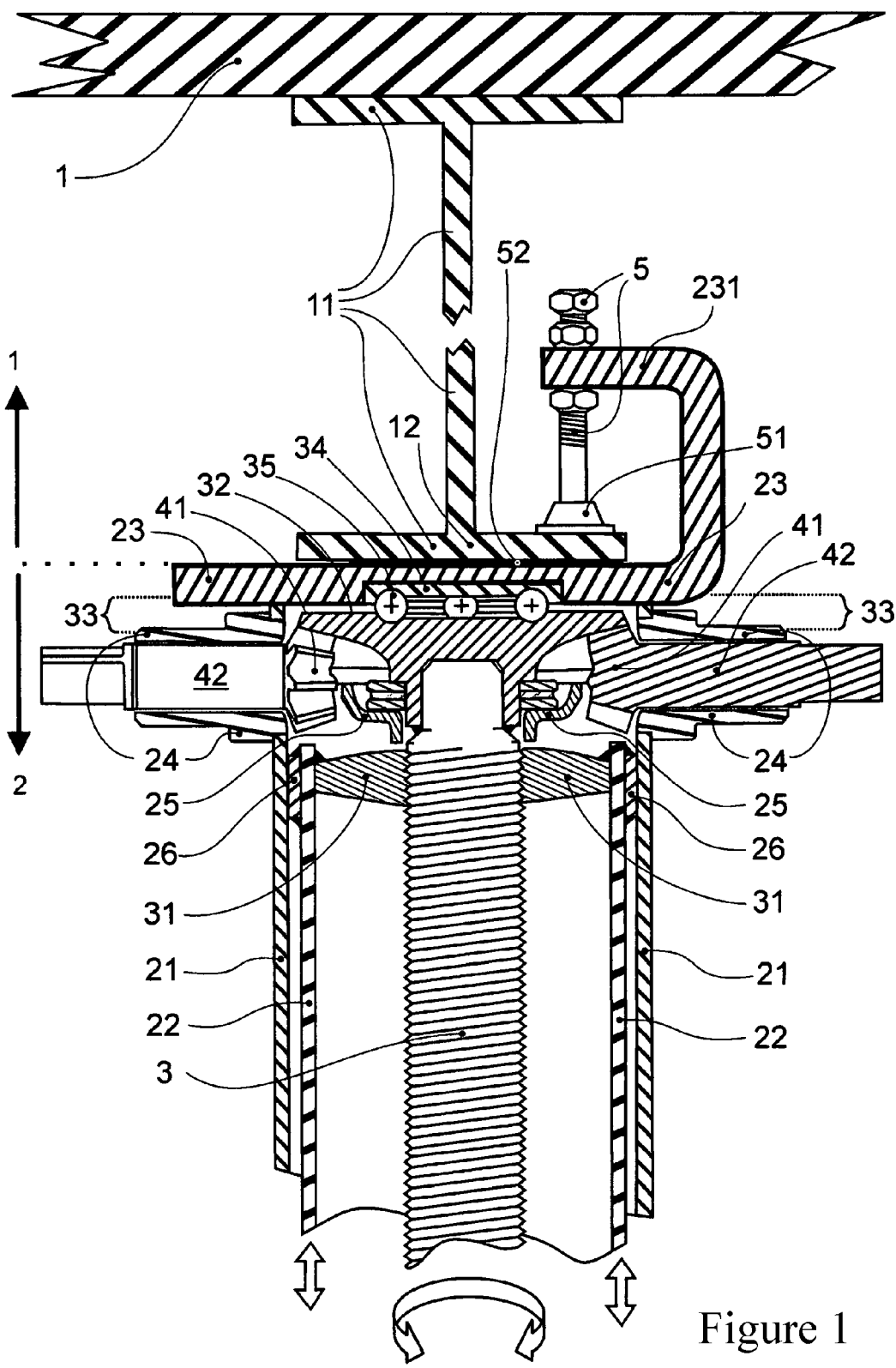
FIG. 1 is a vertical section of support and trailer with a bevel gear as the drive of the crown wheel.

FIG. 1 shows a vertical section of the support (2) and the vehicle trailer (1). The section runs through the central axis of the threaded spindle (3) and shows from the support (2) only the top region with two bevel gears (41) for driving the crown wheel (32) and as an output for moving a second support (2), which is not shown here. From vehicle trailer (1) is shown only the section through a loading area and below that the section through the longitudinal girder (11) with an H-shaped profile, whose lower region—the bottom flange (12)—rests on the support (2). That is to say the bottom flange (12) lies on the cover (23). This cover (23) is that part of the support (2), which closes the prop tube (21) at its top.

The cover (23) has on its downwardly facing surface the most important feature of the invention, namely the upper part of an integrated thrust bearing (33), consisting of a bearing plate (34) into which the annular tread for a plurality of balls (35) is embedded. From this tread are visible in FIG. 1 only the two arc-shaped depressions in the bottom of the bearing plate (34).

In a small distance from the bearing plate (34) the upward-facing surface of the crown wheel (32) is arranged. As well as in the bearing plate (34) an annular tread for the balls (35) is embedded in the upper surface of the crown wheel (32). Also from this tread are visible in FIG. 1 only two depressions in the upper edge of the crown wheel (32). The two aforementioned treads are each a part of the thrust bearing (33), which is designed here as a groove ball bearing.

In FIG. 1 it is very well reproducible how all the vertically aligned forces or force components from the vehicle trailer (1) are derived via the longitudinal girders (11) and its bottom flange (12) into the thrust bearing (33). The upper part of the thrust bearing (33) is the bearing plate (34) in the cover (23); the lower part of the thrust bearing (33) is the crown wheel (32), which is fitted with a large center hole on the head of the threaded spindle (3) and thereby continues the force into the threaded spindle (3). The threaded spindle (3) is screwed into the complementary threads of the threaded bearing (31) which is fixedly connected to the upper end of the inner prop member (22), preferably welded thereto.

In FIG. 1 it is clearly is to be seen that the inner prop member (22) is not connected to the prop tube (21), but rests on the inner surface of the prop tube (21) only with the guiding sleeve (26), which is welded on the outer surface of said inner prop member (22). Therefore said guiding sleeve (26) slides within the support tube (21) vertically up and down, which is symbolized in FIG. 1 by two double arrows.

FIG. 1 shows that all vertical forces are transmitted from the crown wheel (32) via the threaded spindle (3) and the threaded bearing (31) into the inner support (22) without burdening the outer prop tube (21).

FIG. 1 thus presents the key inventive step, namely the integration of the thrust bearing (33) into the crown wheel (32) and the cover (23). Because the lower part of the thrust bearing (33) is a part of the crown wheel (32), and because the bearing plate (34) within the cover (23) is the upper part of the thrust bearing (33), the thrust bearing (33) claims no part at all of the overall height of the support. Or—in other words—thanks to the integration of the thrust bearing (33) into the—anyway required—crown wheel (32) and the cover (23) is omitted that portion of the overall height of the common supports for the axial bearing.

By this inventive feature it is possible for the first time to construct an economically competitive, two-piece support (2), which can be mounted underneath the bottom flange (12) of the longitudinal girder (11) of a vehicle trailer (1), which is shown in the embodiment of FIG. 1:

The cover (23) is extended beyond the edge of the prop tube (21) and near the edge of the bottom flange (12) angled a first time and at a distance to the bottom flange (12) angled upwardly a second time. Thereby the extension of the cover (23) extends with its free arm (231) into the profile of the longitudinal girder (11) and thus forms a retaining clamp, which is U-shaped and encloses the bottom flange (12).

FIG. 1 shows, how in the free arm (231) a clamping fastening (5) is inserted, which rests on the upward-facing surface of the bottom flange (12). The clamping fastening (5) is realized in FIG. 1 as a screw, which is inserted into a borehole in the free arm (231) and then tightened in its clamping position with a nut and a counternut on the free arm (231). A broadened and preferably in relation to the screw rotatable pressure disc (51) at the base of the screw protects the surface coating of the longitudinal girder (11). In this way, the cover (23) and the thereon fixated support (2) are attached to the longitudinal girder (11), without that in the girder (11) itself interventions become necessary.

In the embodiment of FIG. 1 is inserted between the bottom flange (12) and the cover (23) a corrosion protection plate (52)—for example made of zinc metal—in order to avoid damage of the painting on the bottom flange (12) of the longitudinal girder (11).

In addition to the deriving of the weight force of the vehicle trailer (1) it is the second, essential function of the threaded spindle (3), to raise the inner prop member (22). For this purpose the threaded spindle (3) is rotated, as shown in FIG. 1 by an annular double arrow in the pictures bottom.

FIG. 1 illustrates the state in which the inner prop member (22) has moved upwards almost up to the stop of the threaded bearing (31) at the lower edge of the thrust bearing (25). When the stop is reached—which is not shown in FIG.

1—then the top edge of the inner prop member (22) has moved only that close to the bevel gears (41) that they can just rotate freely.

In FIG. 1 it is understandable, but not shown that the inner prop member (22) can be lifted even slightly further, if in its upper edge is cut a bulge for each of the two bevel gears (41). The resulting weakening of the inner prop member (22) would be compensated by a bowl-shaped threaded bearing (31), which is welded into said inner prop member (22) and would be indented too at said two locations. In order to raise the inner prop member (22) an axially acting abutment is required for the assembly group, consisting of crown wheel (32), threaded spindle (3), threaded bearing (31) and inner prop member (22). In the embodiment of FIG. 1, said abutment is visible between the two bevel gears (41) as a bowl-shaped component, which is referred to as an axial guide (25). Therein is arranged a two-piece, axially acting friction bearing, on whose upper side the crown wheel (32) rests with an integrally formed shoulder.

The axial guide (25) and the thereby carried friction bearing only have to withstand the weight of crown wheel (32), threaded spindle (3), threaded bearing (31) and inner prop member (22). Therefore the FIG. 1 shows a very slim axial guide (25), made of pressed sheet metal.

In the cross-section of FIG. 1 the connection of the axial guide (25) with the prop tube (21) is not visible, because cut-outs for the two bevel gears (41) are broken into the axial guide (25). The axial guide (25) is thus connected only on parts of its circumference with the interior of the prop tube (21), e.g. by detachable bolted connections, which is fully sufficient for its relatively low load.

FIG. 1 illustrates impressively that the axial guide (25) does not claim any additional installation space in the direction of the vertical longitudinal axis of the support (2), but is housed in a space, which is necessary anyway for the bevel gears (41).

But looking at FIG. 1 it is also understandable that in a very simple embodiment the axial guide (25) is dispensable, because the axial retention can be taken over by the two bevel gears (41) below the crown wheel (32). With straight toothed bevel gears (41) as the sole axial guide the lifting speed will pulsate slightly, when the inner prop member (22) is lifted. However, this is negligible for the function and for the lifetime, because the bevel gears (41) and the toothing under the crown wheel (32) are dimensioned for lifting the fully loaded vehicle trailer (1), which is much weightier than said components of the support (2), which are to be lifted.

In FIG. 1 the toothing of the crown wheel (32) meshes with two opposite bevel gears (41), which are located each at the inner end of a main shaft (42). Each of said shafts (42) is rotatably mounted in one bushing (24) on the outside of the prop tube (21). The first of these bevel gears (41), the first main shaft (42) and the first bushing (24) are necessary in any case for driving the crown wheel (32).

The second bevel gear (41), the second main shaft (42) and the second bushing (24) are required only, if at the vehicle trailer (1) a second support (2)—not shown in FIG. 1—is built on, which shall be driven by the first support (2). In this case the second main shaft (42) serves as a drive.

In FIG. 1 the outer ends of the two main shafts (42) are each formed as a four cornered square-end. The bevel gears (41), the main shafts (42) and the bushings (24) are each identical and thus cost-saving non-variable parts. One of the two bevel gears (41) serves as the drive of the crown wheel (32). For this purpose on the square of the main shaft (42) is plugged on for example a crank handle or a gearbox with a crank handle—not shown here. By the rotation of this handle the first bevel gear (41) is caused to rotate and thus drives the crown wheel (32). The crown wheel (32) puts not only the threaded spindle (3) in rotation but also the second bevel gear (41). On the square at the end of the second main shaft (42) shall be lugged on with a square bore as coupling a connecting shaft—not shown here—, which drives a second support (2)—also not shown. FIG. 1 shows the upper guiding sleeve (26) between the prop tube (21) and the inner prop member (22), which is a part of an interesting embodiment for limiting the vertical stroke of the inner prop member (22). The upper guiding sleeve (26) is welded to the outside of the inner prop member (22) and slides on the inside of the prop tube (21). In order to limit the stroke the said upper guiding sleeve (26) cooperates with a lower guiding sleeve of the same diameter—not visible here—, which is also arranged between the prop tube (21) and the inner prop member (22), but is fixed to the prop tube (21)—preferably removably. In FIG. 1 it is not visible, but at least understandable that during the downward movement of the inner prop member (22) also the upper guiding sleeve (26) moves downward. Once the upper guiding sleeve (26) impinges onto the lower guiding sleeve—in FIG. 1 not visible—and the front edges of both guiding sleeves contact each other, is a further vertical movement of the inner prop member blocked. This prevents that the inner prop member (22) drops downwardly out from the prop tube (21).

The advantage of this arrangement is that at the lower end of the threaded spindle (3) no additional limitation must be attached, which would increase the overall length of the support (2) and would complicate the installation.

Figure 2:
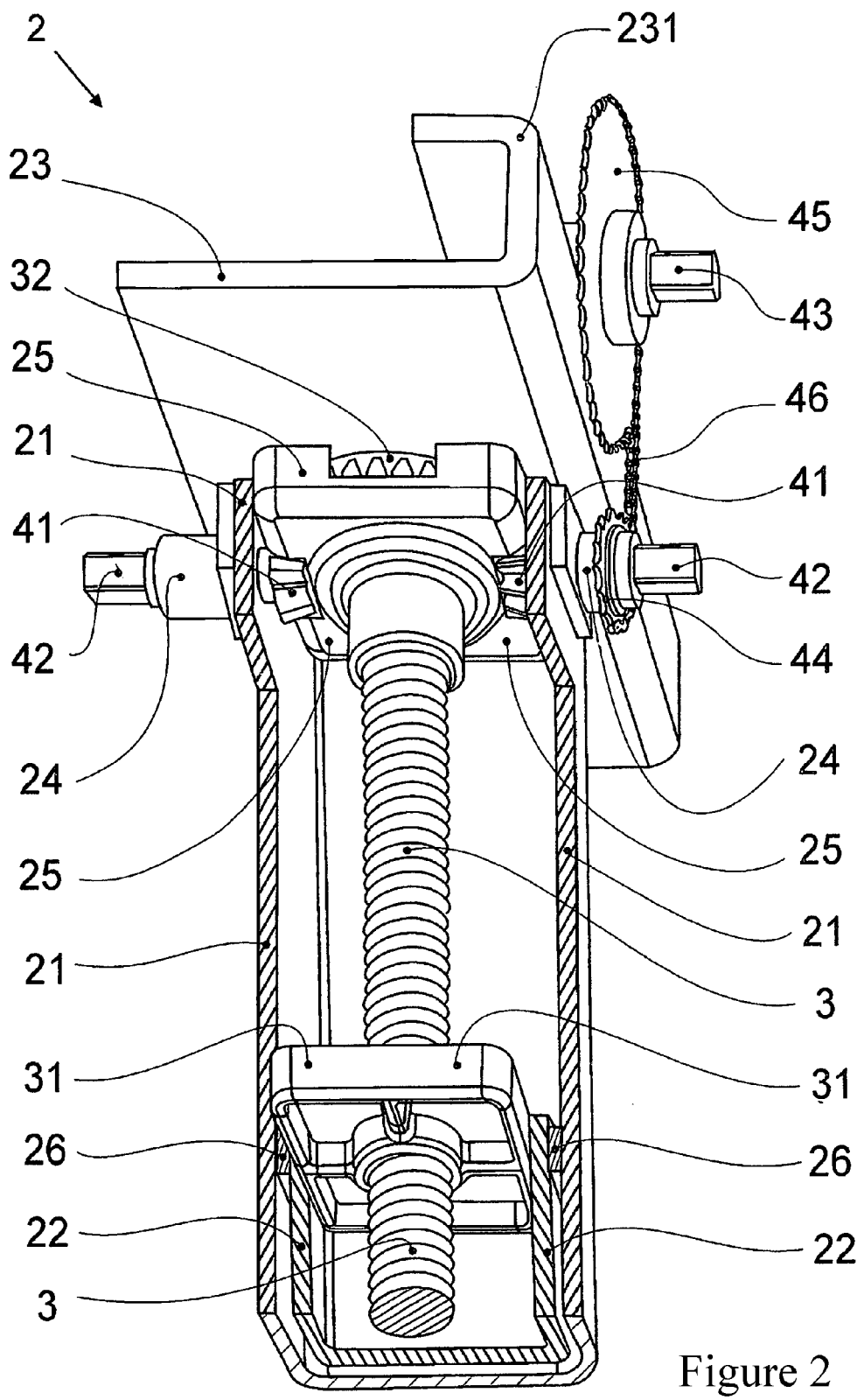
FIG. 2 is a vertical section of support as in FIG. 1, but with a chain gearing.

FIG. 2 shows a vertical section through a support (2) as shown in FIG. 1, but as a perspective drawing and with a chain transmission (44, 45, 46) for two different drive ratios. The chain transmission consists of a first, small sprocket (44) and a second, large sprocket (45), which are connected to one another via the chain (46)—of which only the back half is shown in FIG. 2.

The first sprocket (44) is non-rotatably mounted on the main shaft (42). For attachment and bearing of the second sprocket (45) is used the cover (23), which is extended at its right edge to become a free arm (231) and is angled twice. On the arm (231) a bearing chair is mounted, in which an auxiliary shaft (43) is rotatably mounted, which carries the second sprocket (45).

The free ends of the main shaft (42) and the auxiliary shaft (43) are each formed as a square. Both squares have the same profile, so that a hand crank may be selectively attached to one of the squares. When the hand crank is plugged on the main shaft (42), it rotates through the bevel gear (41) and the crown wheel (32) the threaded spindle (3), which extends and retracts the inner prop member (22). The transmission ratio between the bevel gear (41) and the crown wheel (32) and the pitch of the threaded spindle (3) are dimensioned such that the torque of the hand crank can even adjust the coupling height of a fully loaded vehicle trailer (1) to the height of the coupling plate on the tractor. This mode of operation is the "load speed".

But when only the unloaded inner prop member (22) is to be pushed out of the prop tube (21) or to be drawn there into, the hand crank will be mounted on the auxiliary shaft (43). Because on the auxiliary shaft (43) the second, large sprocket (45) is mounted and rotates via the chain (46) the first, small sprocket (44) on the main shaft (42), the rotational speed of the main shaft (42) is increased relative to the rotational speed of the crank on the auxiliary shaft (43). With relative few revolutions of the driving crank on the main shaft (42) the unloaded inner prop member (22) is quickly extended and retracted. This mode of operation is the "fast speed".

In the most cases it will not be possible, to lift a maximum loaded vehicle trailer (1) in the fast speed, because the torque on the main shaft (42) is reduced relative to the torque of the crank.

Not shown in FIG. 2 but comprehensible is the variant that two additional sprockets with different diameters are mounted on the main shaft (42) and on the auxiliary shaft (43). Said two additional sprockets are connected with another chain. From the entire four sprockets the two lower ones are fixed torque-proof on the main shaft (42). The two upper sprockets are rotatably mounted on the auxiliary shaft (43). A sleeve is slidable on the auxiliary shaft (43) and serves as a clutch between one of the upper sprockets and a hand crank A shift of the sleeve changes between "low speed" and "fast speed". In both operating modes the hand crank is connected with the auxiliary shaft (43). In FIG. 2, the underside of the cover (23) rests on the prop tube (21), which is in the drawing cut open lengthwise. Thereby the view onto the axial guide (25) is cleared. It surrounds the crown wheel (32) that is in contact with the underside of the cover (23).

In FIG. 2 it is very well understood that the crown wheel (32) is held on its underside by the axial guide (25). In the unloaded state of the support the axial guide (25) prevents the threaded spindle (3), the thereupon screwed, threaded bearing (31), the attached inner prop member (22) and all other related parts from dropping down.

FIG. 2 shows that in the axial guide (25) are cut two recesses, through which the two bevel gears (41) protrude. Beside of said recesses the axial guide (25) has a sufficiently large, side-facing surface for a secure connection to the prop tube (21). This shaping of the axial guide (25) claims no additional overall height of the support (2).

FIG. 2 shows an embodiment of the threaded bearing (31) as a forging or casting. Onto the outer edges is formed on a circumferential ridge. From there four smaller ridges proceed towards the center, where they carry the formed on threaded nut, whose internal thread is complementary to the threaded spindle (3). Despite of its low weight this threaded bearing (31) is relatively high resilient.

While specific embodiments of the invention have been shown and described in detail to illustrate the application of the principles of the invention, it will be understood that the invention may be embodied otherwise without departing from such principles.

The invention claimed is:

1. A vertical elongate support for supporting a parked vehicle trailer, the support comprising:
    a top prop tube;
    an inner prop member which can telescopically slide into the prop tube;
    a threaded spindle for moving the inner prop member in relation to the prop tube;
    a threaded bearing secured to an upper end of the inner prop member, whereby the threaded spindle meshes with the threaded bearing that is secured to the upper end of the inner prop member;
    a crown wheel, wherein an upper end of the threaded spindle is connected to the crown wheel, and an upward-facing surface of the crown wheel is part of a thrust bearing, whereby the thrust bearing supports the vehicle trailer via a cover that is connected to the prop tube, wherein the thrust bearing comprises at least one ball, which moves or rolls off in a central recess or in respective circular running grooves, which are formed into the upward-facing surface of the crown wheel and in the downward-facing surface of the cover.

2. A support according to claim 1, wherein for driving the crown wheel a bevel gear or a friction wheel or a spur gear or a worm wheel or a chain, which is partially wrapping around the crown wheel, or a toothed belt or a ball chain engages into a complementary toothing or contact surface on said crown wheel.

3. A support according to claim 2, wherein the bevel gear or a worm wheel is mounted on the main shaft, which is bedded in the prop tube, and on said main shaft a first sprocket is mounted, which is linked via a chain with a second sprocket, having another diameter than said first sprocket and being rotatable mounted on an auxiliary shaft, whereby a hand crank or another drive is connected to the main shaft or to the auxiliary shaft.

4. A support according to claim 1, wherein a shoulder or a pedestal or a recess, which is circular and which comprises a surface that faces with at least partially downward, is formed onto the crown wheel or is inserted between said crown wheel and the threaded spindle, and slides on a complementary profile or is supported by an axially acting bearing, which is arranged centrally in an axial guide, which is fixed in or on the prop tube.

5. A support according to claim 4, wherein the bevel gear or a worm wheel is mounted on the main shaft, which is bedded in the prop tube, and on said main shaft a first sprocket is mounted, which is linked via a chain with a second sprocket, having another diameter than said first sprocket and being rotatable mounted on an auxiliary shaft, whereby a hand crank or another drive is connected to the main shaft or to the auxiliary shaft.

6. A support according to claim 1, wherein the vehicle trailer has on an underside thereof at least one longitudinal girder with an H- or U- or L-shaped profile and the thrust bearing directly supports a bottom flange of this profile.

7. A support according to claim 6, wherein the cover is extended beyond the edge of the prop tube and is folded in a U-shape around the edge of the bottom flange of the longitudinal girder, whereby said cover is connected to a clamping screw or other clamping device, which is shored up on the bottom flange.

8. A support according to claim 1, wherein an upper guiding sleeve is mounted on an outside of the inner prop member near an upper end and slides on the inner surface of the prop tube, and a lower guiding sleeve is mounted and preferably releasably secured on the inside of the prop tube near a lower end and slides on the outer surface of the inner prop member, wherein the end edges of said two guiding sleeves contact each other, if the inner prop member is pushed out maximally.

9. A support according to claim 1, wherein the thrust bearing comprises at least one bearing structure, which moves in one or more recesses or grooves, which are formed into the upward-facing surface of the crown wheel and in the downward-facing surface of the cover.

10. A vehicle trailer with two supports being spaced apart from each other, each of the supports comprising:
    a top prop tube;
    an inner prop member which can telescopically slide into the prop tube;
    a threaded spindle for moving the inner prop member in relation to the prop tube;
    a threaded bearing secured to an upper end of the inner prop member, whereby the threaded spindle meshes with the threaded bearing that is secured to the upper end of the inner prop member; and a crown wheel, wherein an upper end of the threaded spindle is connected to the crown wheel, and an upward-facing surface of the crown wheel is part of a thrust bearing or is configured to accommodate a thrust bearing, whereby the thrust bearing supports the vehicle trailer, either directly or via a cover that is connected to the prop tube wherein the two threaded spindles in the supports are connected by a chain or by a toothed belt or by a ball chain and thereby can be put in rotation together, whereby the said chain or the said toothed belt or the said ball chain meshes with complementary tooth works, which are arranged on both crown wheels or on worm gears or on bevel gears or on two spur gears, each of them is engaging in one of said crown wheels, or on auxiliary wheels, which are linked with the latter three wheels.

11. A vehicle trailer according to claim 10, wherein the threaded spindles in said supports are shaped identically and the crown wheel of each said supports meshes with one bevel gear and said two bevel gears are connected by a rotatably mounted shaft, in which is built in—for reversing the direction of rotation—a differential gear or an auxiliary shaft with a pair of spur gears at the first end and at the second end two wheels, connected via chains or pulleys, or another gear.

12. A vertical elongate support for supporting a parked vehicle trailer, the support comprising:
   a top prop tube;
   an inner prop member which can telescopically slide into the prop tube;
   a threaded spindle for moving the inner prop member in relation to the prop tube;
   a threaded bearing secured to an upper end of the inner prop member, whereby the threaded spindle meshes with the threaded bearing that is secured to the upper end of the inner prop member;
   a crown wheel, wherein an upper end of the threaded spindle is connected to the crown wheel, and an upward-facing surface of the crown wheel is part of a thrust bearing or is configured to accommodate a thrust bearing, whereby the thrust bearing supports the vehicle trailer, either directly or via a cover that is connected to the top prop tube, the crown wheel comprising a contact surface facing in a direction of the inner prop member; and
   a bevel gear, at least a portion of the bevel gear being in direct contact with the contact surface of the crown wheel.

13. A support according to claim 12, wherein the inner prop member is located at a position below the crown wheel.

14. A support according to claim 13, wherein the bevel gear is located below the crown wheel.

15. A support according to claim 12, wherein the bevel gear is located below the crown wheel.

16. A support according to claim 12, wherein the crown wheel is located above the bevel gear.

17. A support according to claim 12, wherein the crown wheel comprises an upper surface facing in a direction of the vehicle trailer or the cover and the crown wheel comprises a lower surface located opposite the upper surface, the lower surface comprising the contact surface.

18. A support according to claim 12, wherein the thrust bearing comprises at least one ball, which moves or rolls off in a central recess or in respective circular running grooves, which are formed into the upward-facing surface of the crown wheel and in the downward-facing surface of the cover.

19. A support according to claim 12, wherein the thrust bearing comprises at least one bearing structure, which moves in one or more recesses or grooves, the one or more recesses or grooves being formed in the upward-facing surface of the crown wheel and in the downward-facing surface of the cover.

* * * * *